D. E. PARIS.
Cooking Stove.
No. 70,890.
Patented Nov. 12, 1867.
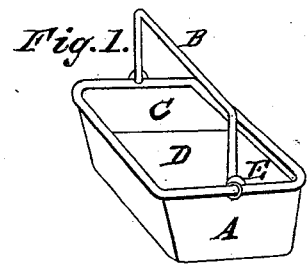
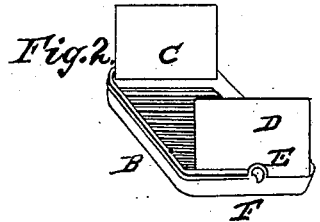
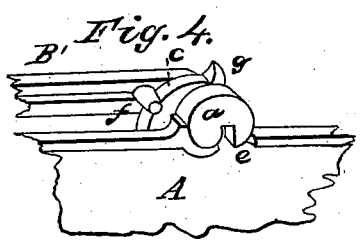
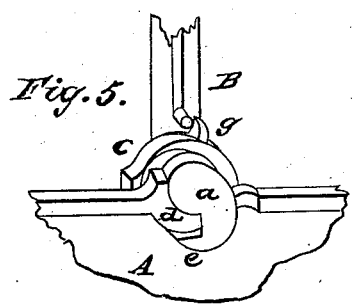
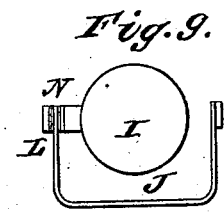
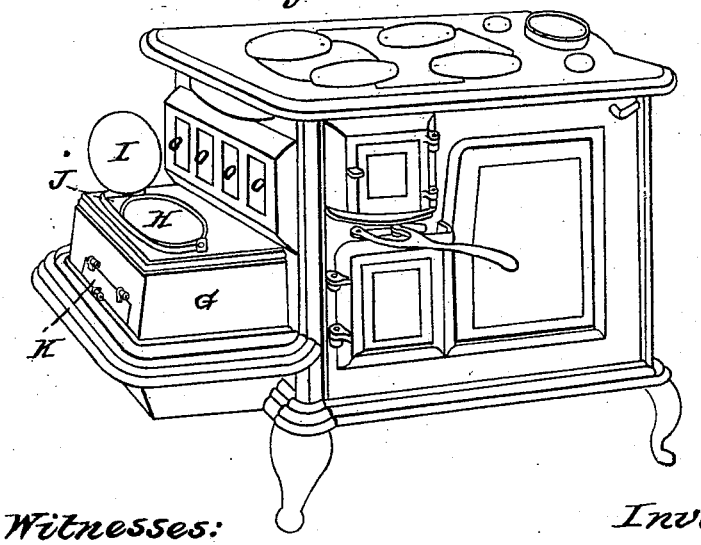
Witnesses:
Inventor:

United States Patent Office.

DANIEL E. PARIS, OF TROY, NEW YORK.

Letters Patent No. 70,890, dated November 12, 1867.

---

ASH-SIFTER.

---

The Schedule referred to in these Letters Patent and making part of the same.

---

TO ALL WHOM IT MAY CONCERN:

Be it known that I, DANIEL E. PARIS, of Troy, in the county of Rensselaer, and State of New York, have invented new and useful improvements in Ash-Sifters and Pans; and I do hereby claim that the following is a full, clear, and accurate description of the same, which will enable others skilled in the art to make and use the same, reference being had to the accompanying drawings, forming a part of this specification, in which—

Figure 1 shows the ash-pan, the sifter being concealed by the covers C and D.

Figure 2 shows the ash-sifter, with the covers standing upright and the bail lying flat.

Figure 3 shows the formation of one end of the bail to the sifter, or, when used alone, the lifter to the ash-pan.

Figure 4 shows the bail lying flat, engaged with the end of the sifter, and in position to engage with the ash-pan through the slot at each side of the same, which is done by lifting the bail up into an upright position, as shown in Figure 5.

Figure 6 shows the arrangement of the ash-pan at each side or end of the same.

Figure 7 shows the ear to the ash-sifter into which its bail B is sprung, which is done by first inserting one end of the bail in one ear and then springing it into the other.

This invention has for its object a new and better method of handling and moving ash-sifters, which is done by means of the bail B, which is made with the projecting hook $a\ e$ at either end of the same, so that it will engage with the ash-pan A through the slots cast at each side or end of the same, whenever said bail is raised into a vertical position, as shown in fig. 5; thus both the sifter and the pan are moved at once and together by one bail, that of the sifter. The sifter can be raised separately from the pan by lifting it up when the bail is at an angle of forty-five degrees or thereabouts, at least it must be less than perpendicular, or it will engage with the pan also.

The advantages of this invention are briefly as follows: Most people prefer to sift their ashes from the coal or cinders out of doors, in a shed or some place other than the room where the stove is used; and in such case, by taking hold of the bail, raising it up vertically, the sifter and pan are grappled together, and both carried to the place desired. The pan is then disengaged from the sifter, and after the ashes are removed the coals are left clear in the sifter. The sifter is then replaced in the pan, and both carried back, the pan placed in the stove, and the contents of the sifter emptied into the fire-box by means of its bail. The same process is adopted if the coals are sifted in the house, and in any case the bail is always ready to move the sifter or pan and sifter both together; and in either case the coals are saved from the siftings, and cannot possibly mix with the ashes; all of it is saved and returned to the fire-box, both pieces having all the advantages of two separate bails.

Ash-sifters situated inside of an ash-pan have not heretofore, I believe, been made with bails. I suppose one of the reasons why this has not been done is, because it is very difficult to make a bail to both articles, for the reason that there is not room for them both in an ordinary ash-pit, and for the further and greater reason that a bail to an ash-sifter simply would be of no use, unless the ashes are to be sifted inside of the stove; for as soon as one should attempt to carry it, before sifted, with every slightest motion the ashes would fall through it, leaving a mark wherever carried. Thus, if taken from the stove before sifting, the sifter and pan must be carried both together, so that the pan will catch the ashes that are constantly dropping from the sifter. This could be done by making two bails, but this would not be practicable, for if made of sufficient size they would occupy room, and in any event would be in the way of each other, and, what is more, the expense would be doubled. Here I have a bail to the sifter only, and no bail at all to the ash-pan, for that has neither a bail nor any place to put a bail. The slots at each end of the pan are like the slots in a griddle or cover to the stove-top. Stove-covers have no bails or lifters, though they may have a place for a lifter; so this ash-pan has no bail nor any place for a bail, as such, though it has a place for a lifter at either end. The very idea of a bail is a permanent fixture to an article. It may be movable or separable, like the bail to my sifter, which is easily disengaged by springing it in a little, yet it is just as much a bail as though it were a permanent fixture. So when the two are used together, (the sifter and the pan,) the sifter sitting inside the pan, the latter can certainly have no bail, for two separate or separable objects cannot both have one and the same bail.

But I use the bail to my sifter separate from the sifter with wood and soft-coal stoves, where no sifting is needed. I use the bail there as a lifter to the ash-pan, a double self-adjusting lifter, which is neither attached nor attachable to the pan, and is only engaged with it while in actual use; for the moment that it is let down horizontally, it becomes of itself at once disengaged with the pan. If it had to be taken out, pushed, or sprung out, it would then be a bail; but as now made it is only a lifter. The object and great utility of this double lifter over a bail is, that it does not get hot. It is cool and ready for use at all times, for it is not left, and cannot be left, engaged with the pan any longer than it is in actual use; and when not in use, it is or should be laid aside and kept cool. Therefore for use in a hot place, like an ash-chamber, this lifter will be preferred to a bail, for it can always be kept cool, and when used as a lifter only it can have a wooden handle, if desired.

Having thus described my invention, what I claim, and desire to secure by Letters Patent, is—

1. A bail to an ash-sifter used separately from an ash-pan, or constructed with hooks or lugs at either end of the bail, so as to engage with an ash-pan surrounding or enclosing the sifter, and so that both sifter and pan can be moved by the bail or the sifter separately.

2. I claim a double self-acting lifter to an ash-pan or ash-lifter, so constructed with hooks or other means of moving the pan or sifter, but not attached or attachable to them, except while in actual use or in vertical position, as herein described and explained.

DANIEL E. PARIS.

Witnesses:
 LOUIS POTTER,
 CHAS. E. POTTER.